(12) United States Patent
Schaefer et al.

(10) Patent No.: US 12,365,114 B2
(45) Date of Patent: Jul. 22, 2025

(54) METHOD AND SYSTEM FOR ESTABLISHING A CONNECTION BETWEEN A MACHINE TOOL AND AN AUXILIARY DEVICE AND TESTING AN EMERGENCY CUTOUT FUNCTIONALITY OF THE AUXILIARY DEVICE

(71) Applicant: Hilti Aktiengesellschaft, Schaan (LI)

(72) Inventors: Martin Schaefer, Schwarzach (AT);
Marco Balter, Feldkirch (AT);
Christian Metzler, Satteins (AT)

(73) Assignee: Hilti Aktiengesellschaft, Schaan (LI)

( * ) Notice: Subject to any disclaimer, the term of this patent is extended or adjusted under 35 U.S.C. 154(b) by 814 days.

(21) Appl. No.: 17/311,061

(22) PCT Filed: Nov. 20, 2019

(86) PCT No.: PCT/EP2019/081937
§ 371 (c)(1),
(2) Date: Jun. 4, 2021

(87) PCT Pub. No.: WO2020/114774
PCT Pub. Date: Jun. 11, 2020

(65) Prior Publication Data
US 2022/0024074 A1    Jan. 27, 2022

(30) Foreign Application Priority Data

Dec. 5, 2018  (EP) ..................... 18210394

(51) Int. Cl.
*B28D 7/00*       (2006.01)
*G05B 19/4155*  (2006.01)

(52) U.S. Cl.
CPC ......... *B28D 7/005* (2013.01); *G05B 19/4155* (2013.01); *G05B 2219/45129* (2013.01)

(58) Field of Classification Search
CPC .............. G05B 19/4155; G05B 19/406; G05B 2219/45129; G05B 2219/50198;
(Continued)

(56) References Cited

U.S. PATENT DOCUMENTS 5,069,522 A * 12/1991 Block .................. H04B 10/50
398/139
5,195,126 A *  3/1993 Carrier ................ G08B 25/016
379/49

(Continued)

FOREIGN PATENT DOCUMENTS

EP    1 712 965 A1    10/2006
EP    3 292 969 A1     3/2018
JP    09150798 A  *   6/1997  ............. B64C 27/56

OTHER PUBLICATIONS

JP-09150798-A (Jun. 10, 1997), machine translation.*
(Continued)

*Primary Examiner* — M. N. Von Buhr
(74) *Attorney, Agent, or Firm* — Crowell & Moring LLP

(57) ABSTRACT

A method for operating a system that includes a main machine tool, an auxiliary device, and a transmission device with a first sending and receiving device assigned to the main machine tool and a second sending and receiving device assigned to the auxiliary device includes sending a first signal that represents a connection inquiry from the first sending and receiving device to the second sending and receiving device after an actuation of an input device of the main machine tool by a user. A second signal that represents a connection response from the second sending and receiving device is sent to the first sending and receiving device after an actuation of an actuating device of the auxiliary device by the user. The method further includes activating and/or testing an emergency cutout functionality of the
(Continued)

actuating device by the actuation of the actuating device of the auxiliary device by the user.

5 Claims, 2 Drawing Sheets

(58) Field of Classification Search
CPC . B28D 1/04; B28D 1/041; B28D 7/00; B28D 7/005
See application file for complete search history.

(56) References Cited

U.S. PATENT DOCUMENTS

| | | | | |
|---|---|---|---|---|
| 5,933,497 | A * | 8/1999 | Beetcher | G06F 21/121 713/189 |
| 6,711,713 | B1 * | 3/2004 | Rumpler | H04L 1/22 700/21 |
| 7,121,920 | B1 * | 10/2006 | Triplett | B24B 49/16 451/5 |
| 7,232,361 | B1 * | 6/2007 | Triplett | B24B 49/16 451/8 |
| 7,501,778 | B2 * | 3/2009 | Hashimoto | B25J 9/1674 901/1 |
| 7,993,055 | B2 * | 8/2011 | Nurse | G04G 13/026 368/244 |
| 8,199,446 | B2 * | 6/2012 | Bonasia | H02H 3/335 361/42 |
| 8,334,622 | B2 * | 12/2012 | Olsson | G05B 9/02 307/326 |
| 8,396,504 | B2 * | 3/2013 | Choumaru | H04W 52/0241 455/574 |
| 10,477,415 | B1 * | 11/2019 | Mar | H04W 52/36 |
| 10,552,599 | B2 * | 2/2020 | Tommy | G06F 21/36 |
| 11,698,792 | B2 * | 7/2023 | Guan | G06F 21/32 726/19 |
| 2007/0096674 | A1 * | 5/2007 | Hashimoto | B25J 9/1674 318/568.13 |
| 2014/0336793 | A1 * | 11/2014 | Gromes, Sr. | B26D 7/22 700/81 |
| 2021/0314796 | A1 * | 10/2021 | Hoang | H04W 52/36 |

OTHER PUBLICATIONS

PCT/EP2019/081937, International Search Report dated Dec. 10, 2019 (Three (3) pages).

Fukui et al., "Development of teaching pendant optimized for robot application", Advanced Robotics and Its Social Impacts (ARSO), 2009 IEEE Workshop on, IEEE, Piscataway, NJ, USA, Nov. 23, 2009, pp. 72-77, XP031764330.

Chris Hoffman, "How to Pair a Bluetooth Device to Your Computer, Tablet, or Phone", URL: https://www.howtogeek.com/214185/beginner-geek-how-to-pair-devices-over-bluetooth/ Jul. 5, 2015, pp. 1-5, XP055597095.

* cited by examiner

METHOD AND SYSTEM FOR ESTABLISHING A CONNECTION BETWEEN A MACHINE TOOL AND AN AUXILIARY DEVICE AND TESTING AN EMERGENCY CUTOUT FUNCTIONALITY OF THE AUXILIARY DEVICE

BACKGROUND AND SUMMARY OF THE INVENTION

The present invention relates to a method for operating a system comprising a main machine tool and an auxiliary device. The invention also relates to an auxiliary device for carrying out the method and to a system having a machine main machine tool and such an auxiliary device for carrying out such a method.

Core drilling machines are known from practice as such main machine tools, formed in combination with a drilling tool, designed for example as a drill bit, for producing holes drilled in materials, for example mineral materials, such as for example concrete, brickwork or the like. To assist a core drilling operation, a number of auxiliary devices may be provided. For example, a machine stand may be used for mounting the core drilling machine and a feeding device for displacing the core drilling machine, in particular in an automated manner, along the machine stand.

At the same time, the provision of a control device and a wireless transmission device is known, both the core drilling machine and the auxiliary device respectively having a sending and receiving device for exchanging signals. To establish reliable wireless communication between the core drilling machine and the auxiliary device, the core drilling machine has an input device, a signal that represents a connection inquiry being sent from the core drilling machine to the auxiliary device after actuation of the input device by the user. The auxiliary device has an actuating device, by means of which a further signal that represents a connection response is sent from the auxiliary device to the core drilling machine, and then a pairing and authenticating process is completed.

Before the auxiliary device is put into operation, an emergency cutout switch has to be tested by a user and put into an enabling position in order to make operation of the auxiliary device possible.

However, such a procedure for establishing the reliable connection and for activating or testing the emergency cutout functionality is laborious.

An object of the present invention is to provide a method for operating a system having a main machine tool and an auxiliary device and to provide an auxiliary device and a system for carrying out such a method, reliable communication between the main machine tool and the auxiliary device and activation or testing of an emergency cutout functionality being achievable in an easy, reliable and low-cost way.

The object is achieved with a method for operating a system comprising a main machine tool and an auxiliary device, the main machine tool and the auxiliary device respectively having a sending and receiving device of a transmission device, and the main machine tool being designed with an input device and the auxiliary device being designed with an actuating device, and a control device being provided, by the method comprising the following steps:

sending at least one signal that represents a connection inquiry from the sending and receiving device of the main machine tool to the sending and receiving device of the auxiliary device after an actuation of an input device of the main machine tool by the user;

sending at least one further signal that represents a connection response from the sending and receiving device of the auxiliary device to the sending and receiving device of the main machine tool after an actuation of the actuating device of the main machine tool by the user;

establishing a connection between the main machine tool and the auxiliary device; and activating and/or testing an emergency cutout functionality of the actuating device by the actuation of the actuating device of the auxiliary device by the user.

With the method according to the invention, both a reliable connection between the main machine tool and the auxiliary device, in particular by a pairing and authenticating process, known as a pairing process, and an emergency cutout functionality are achievable in a low-cost, easy and reliable way. A method according to the invention can be implemented at low cost, since only a single actuating device is required on the auxiliary device to establish the reliable connection between the main machine tool and the auxiliary device. The method according to the invention can be implemented easily and reliably, since establishing the reliable connection and activating and/or testing the emergency cutout functionality are carried out together in a single process and are part of a procedure that can be implemented intuitively.

A reliable connection between the main machine tool and the auxiliary device is established in particular when the further signal is verified by the control device and is received by the sending and receiving device of the main machine tool for example within a predetermined time period after the transmission of the signal from the main machine tool to the auxiliary device. In order to be able to establish the reliable connection between the main machine tool and the auxiliary device, it may be provided for example that there is a further data exchange between the main machine tool and the auxiliary device, which may include an interaction, an encoding, a signing and the use of standardized protocols, in particular for functional reliability.

In the case of an embodiment of a method according to the invention that can be easily carried out, it may be provided that the auxiliary device is brought into a state enabling operation of the auxiliary device by the actuation of the actuating device of the auxiliary device by the user, and no further action on the part of the user is required for this.

Reliable operation of the system can be achieved in an easy way if, when the actuating device is actuated after an activation of the emergency cutout functionality and when the auxiliary device is operating, the auxiliary device and/or the main machine tool is or are deactivated.

Also provided is an auxiliary device for carrying out such a method, the auxiliary device having a sending and receiving device of a transmission device and an actuating device.

An auxiliary device designed according to the invention can be produced at low cost, since only a single actuating device is required for establishing a reliable connection between the main machine tool and the auxiliary device sent for testing or activating the emergency cutout functionality. The auxiliary device can also be operated easily and reliably, since the establishment of the reliable connection and the testing of the emergency cutout functionality or the activating of the emergency cutout functionality are carried out together in a single process and are part of a procedure that can be implemented intuitively.

In the case of a design of an auxiliary device according to the invention that can be implemented easily and at low cost, the actuating device is adjustable between two positions, operation of the auxiliary device being prevented in a first position of the actuating device and operation of the auxiliary device being enabled and an emergency cutout functionality activated in a second position of the actuating device.

The actuating device is preferably designed as a switch, pushbutton or the like.

The auxiliary device is for example a feeding device for a main machine tool, designed in particular as a core drilling machine or a wall sawing machine.

Also provided is a system for carrying out such a method, a main machine tool, such an auxiliary device and a control device being provided and both the main machine tool and the auxiliary device respectively being designed with a sending and receiving device of a transmission device, and the main machine tool having an input device and the auxiliary device having an actuating device.

A system designed according to the invention can be produced at low cost, since a single actuating device of the auxiliary device is sufficient for establishing a reliable connection between the main machine tool and the auxiliary device and for testing or activating the emergency cutout functionality. The system can also be operated easily and reliably, since the establishment of the reliable connection and the testing of the emergency cutout functionality or the activating of the emergency cutout functionality can be carried out together in a single process and are part of a procedure that can be implemented intuitively.

It may be provided that, for ensuring the emergency cutout functionality, the actuating device is actuated and subsequently let go, and then an actuation of the main machine tool is enabled.

In the case of an advantageous design of the invention, the transmission device is a wireless transmission device, in particular an optical transmission device or a radio transmission device. The transmission device may in this case be based on various operating principles and/or standards. The way in which the transmission device operates may be based on a signal transmission in the radio frequency range, for example by means of ultrashort wave, short wave or medium wave, or a signal transmission in the infrared or optical frequency range. In particular, the transmission device is designed as an RFID transmission device, as a Bluetooth transmission device, as a Bluetooth Low Energy (BLE) transmission device, as an NFC transmission device, as a Wi-Fi transmission device, as a QR transmission device or as a DMC transmission device. Furthermore, the transmission device may be designed as a WLAN transmission device, as a ZigBee transmission device, as a Wibree transmission device, as a WiMAX transmission device, as a LoRa transmission device, as an IrDA transmission device or as a transmission device operating on the basis of optical line-of-sight radio.

In the case of an advantageous design of the invention, the main machine tool is a core drilling machine tool or a wall sawing machine, it being possible for the auxiliary device to be a feeding device for the main machine tool.

Further advantages can be found in the description of the figures that follows. In the figures, an exemplary embodiment of the present invention is represented. The figures, the description and the claims contain numerous features in combination. A person skilled in the art will expediently also consider the features individually and combine them to produce further useful combinations.

DETAILED DESCRIPTION OF THE DRAWINGS

Figure 1:
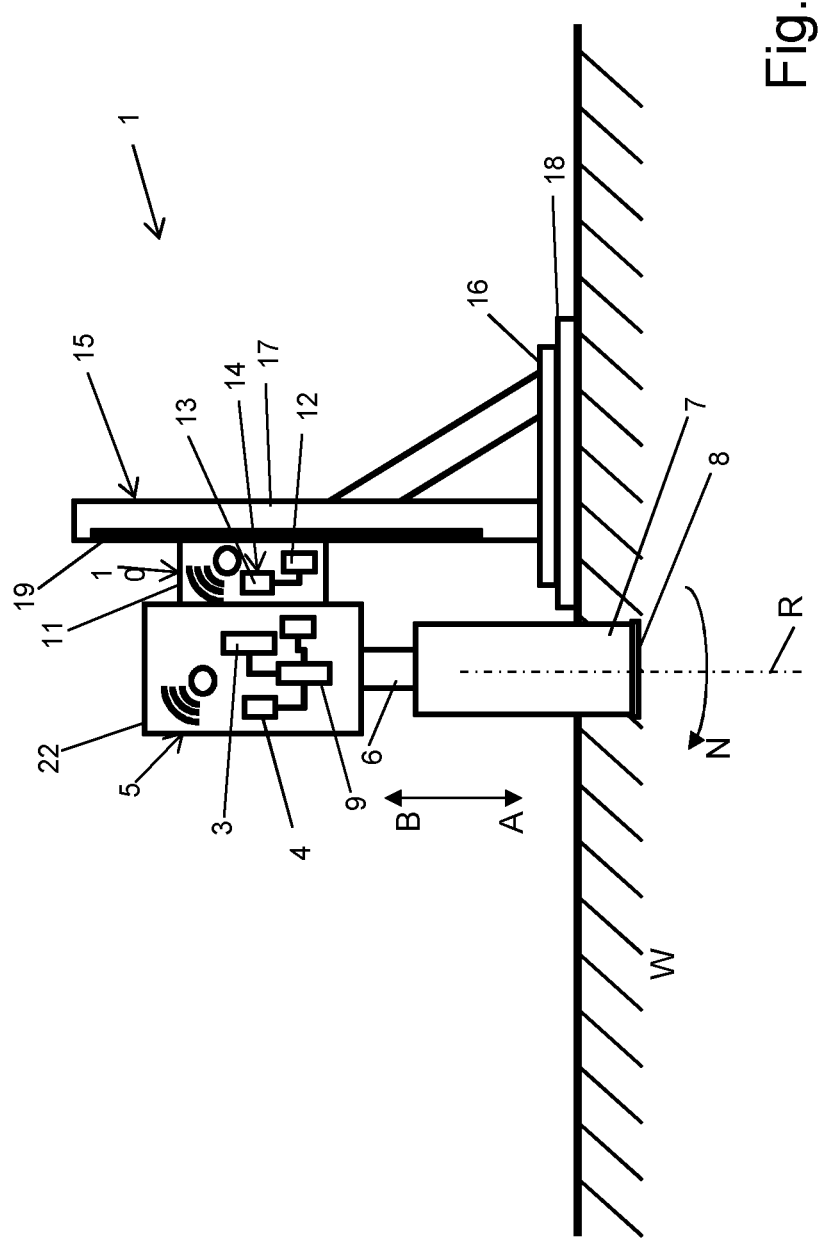
FIG. 1 shows a simplified representation of a system having a core drilling machine, a drill stand and a feeding device.

FIG. 1 shows a system 1 designed according to the invention, comprising a main machine tool 5 designed as a core drilling machine. The core drilling machine 5 is designed for cutting holes in hard materials W, such as for example concrete, cement, brickwork or the like.

The system 1 also has an auxiliary device designed as a feeding device 10 or driving device, by means of which the core drilling machine 5 is movably connected to a drill stand 15. The drill stand 15 has substantially a foot device 16 and also a guiding device designed as a guide rail 17. As shown in FIG. 1, the foot device 16 may be fastened horizontally on a base material W to be machined. As an alternative to this, the foot device 16 may also be arranged on sloping or in particular vertically extending base materials.

The fastening of the foot device 16 on the base material W may in this case take place by means of screws or a bracing. In the present case, the drill stand 15 has in the region of the foot device 16 a fixing device 18 in the form of a vacuum ring. The fixing device 18 is for example connected to a vacuum device (which cannot be seen any more specifically), by means of which an annular space of the fixing device 18 can be subjected to a vacuum, so that the drill stand 15 is securely held on the base material W by the vacuum present in the region of the annular space.

The guide rail 17 extends here substantially at a 90° angle to the foot device 16 or to the base material W. As an alternative to this, the guide rail 17 may also be connected to the foot device 16 at an angle greater than or less than 90° with respect to the foot device 16 or the base material W.

Furthermore, the guide rail 17 has on one side a rack device 19, which extends over a large part of the length of the guide rail 17 and in particular substantially over the entire length of the guide rail 17.

As already mentioned above, the feeding device 10 is positioned between the core drilling machine 5 and the drill stand 15. With the aid of the feeding device 10, the core drilling machine 5 can be moved along the guide rail 17 of the drill stand 15. With reference to the exemplary embodiment represented in FIG. 1, the core drilling machine 5 can be moved reversibly in the direction of the arrow A or B. The feeding device 10 has for this purpose a first fastening device (not represented in FIG. 1), with which the core drilling machine 5 can be releasably attached to a housing 11 of the feeding device 10. In addition, the feeding device 10 also has a second fastening device (which likewise cannot be seen in FIG. 1), with which the housing 11 of the feeding device 10 can be connected to the guide rail 17 of the drill stand 15. The second fastening device has for this purpose a holding unit (not shown) and a gear wheel unit (likewise not shown). With the aid of the holding unit, the feeding device 10 is held on the guide rail 17. The correspondingly designed gear wheel engages in the rack device and thereby guides the feeding device 10 along the guide rail 17. In order to set the gear wheel unit in a rotating movement, the feeding device 10 also has a drive. The drive may be an electric motor together with a gear or transmission unit. The electric motor may be for example a universal motor. However, other suitable electric motors are also possible. Neither the drive nor the gear or transmission unit is represented in the figures.

The feeding device 10 also includes a closed-loop and open-loop control device, with which movement parameters such as the speed, distance covered, movement starting point and movement ending point as well as other parameters of the feeding device 10 in relation to the drill stand 15 can be controlled in a closed-loop or open-loop manner.

The main machine tool, designed as a core drilling machine 5, includes substantially a housing 22, a drive unit, a gear mechanism, an open-loop and closed-loop control device 9, a drive shaft and an output shaft 6. The open-loop and closed-loop control device 9 includes a controller for controlling the motor current in a closed-loop and open-loop manner. The drive unit, the gear mechanism and the drive shaft are not represented in the figures.

Connected to the output shaft 6 is a drilling tool 7 in the form of a drill bit. The drill bit 7 has at a free end a cutting edge 8, with which the material to be machined can be cut in order to produce a drilled hole. For this purpose, the drive unit, designed as an electric motor, sets the drill bit 7 in a rotating movement in the direction N. Both the drill bit 7 and the output shaft 6 rotate about the common axis of rotation R. The open-loop and closed-loop control device 9 serves for controlling the drive unit designed as an electric motor in an open-loop or closed-loop manner. It involves in particular controlling the rotational speed of the electric motor in an open-loop or closed-loop manner. In addition, a specific mode can be set in accordance with the respective situation of the drilling operation.

For carrying out the actual drilling operation, the core drilling machine 5 with the drill bit 7 connected thereto is positioned by means of the drill stand 15 on the material W to be machined and is fastened.

With the aid of the open-loop and closed-loop control device 9, a gear is selected on the gear mechanism of the core drilling machine 5 and is correspondingly engaged. The gear to be selected is determined on the basis of the diameter of the drill bit 7 that is used. By the selected gear, the rotational speed of the electric motor at which it is intended to rotate is correspondingly fixed. The gear mechanism, and in particular the selected gear of the gear mechanism, allow the drill bit 7 to rotate at a corresponding rotational speed, with a corresponding torque and a corresponding pressing force. In the case of an alternative design, it may also be provided that the gear to be selected can be manually engaged. As an alternative to this, the parameters of the rotational speed, torque and pressing force may for example also be selected in dependence on further criteria, such as for example a manually selectable operating mode, for example an economy mode or a high-performance mode, or in dependence on the base material that is present.

Next, an on and off switch on the core drilling machine 5 is actuated. The on and off switch is a component part of the open-loop and closed-loop control device 9 and is not represented in the figures. After the actuation of the on and off switch, the drill bit 7 begins to rotate in direction N. At the beginning of the drilling operation, the drill bit 7, and in particular the cutting edge 8 of the drill bit 7, are still above the material W (in the direction of arrow B). The position of the drill bit 7 above the material W is not represented in the figures.

At the beginning of the drilling operation, the core drilling machine 5 with the rotating drill bit 7 is moved by means of the feeding device 10 along the guide rail 17 of the drill stand 15 toward the material W (direction of arrow A in FIG. 1).

As soon as the cutting edge 8 of the drill bit 7 comes into contact with the surface of the material W, the drill bit 7 is pressed with a relatively small pressing force onto the material W (direction of arrow A), in order to cut a first guide channel into the surface of the material W. The pressing force is generated by the feeding device 10 and is controlled in an open-loop or closed-loop manner by means of the closed-loop and open-loop control device of the feeding device 10. For example, the depth in the direction of the arrow A is approximately between 2 and 5 mm. A relatively low pressing force is in this case necessary, since otherwise, due to the high resistance of the hard material W, the rotational speed of the drill bit 7 falls too much, or the drill bit 7 may come to a standstill completely. With a rotational speed that is too low, the performance of the drill bit 7, i.e., in particular the cutting performance of the drill bit 7 in the material W, is correspondingly also reduced, as a result of which sufficient drilling progress can no longer be achieved.

A transmission device 14 is provided, having a sending and receiving device 3 assigned to the core drilling machine 5 and having a sending and receiving device 13 assigned to the feeding device 10. The transmission device 14 is designed in a wireless manner and may in principle operate by means of any selectable transmission principles. For example, the transmission device 14 may be designed as a radio transmission device. In particular, the transmission device 14 is an RFID transmission device, but as an alternative to this may for example also be a Bluetooth transmission device, an NFC transmission device, a Wi-Fi transmission device, a QR transmission device, a DMC transmission device, a WLAN transmission device, a ZigBee transmission device, a Wibree transmission device, a WiMAX transmission device, an IrDA transmission device or a transmission device operating on the basis of optical line-of-sight radio.

Provided in the present case is a memory device 21, which is connected to the open-loop and closed-loop control device 9 and in which signals transmitted by way of the transmission device 14 can be at least temporarily stored. The items of information stored in the memory device 21 can be read out and evaluated.

Before the core drilling machine 5 can be operated to produce the core drilled hole, in the present case a reliable connection between the core drilling machine 5 and the feeding device 10 is established and an emergency cutout functionality of the feeding device 10 is tested and/or activated. For this purpose, the core drilling machine 5 has an input device 4 designed for the user to enter requirements, for example in the form of a switch, and the feeding device 10 has an actuating device 12, in particular designed as a switch. Here, the switch 12 can be displaced between a first position and a second position, actuation of the feeding device 10 not being possible or being deactivated in the first position of the switch 12.

When the switch 12 is transferred from the first position into the second position, in the present case both a reliable connection between the core drilling machine 5 and the feeding device 10 can be established and an emergency cutout functionality of the feeding device 10 that is implemented in the switch 12 can be activated. It may also be provided that the displacement of the switch 12 from the first position into the second position additionally also has the effect that an actuation of the feeding device 10 and/or of the core drilling machine 5 can be enabled. The establishment of a reliable connection between the core drilling machine 5 and the feeding device 10 is understood as meaning the performance of a pairing and authenticating process, known as a pairing process.

Figure 2:
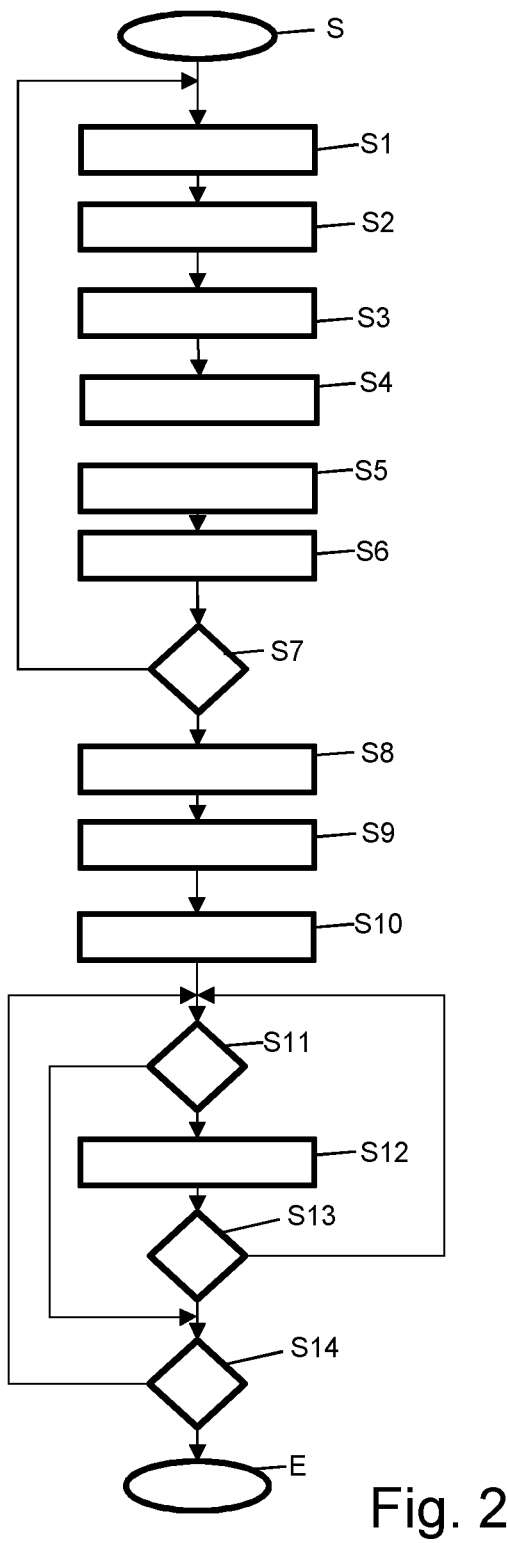
FIG. 2 shows a simplified representation of a flow diagram of an embodiment of a method according to the invention for operating the system according to FIG. 1.

There follows a more detailed description of a method for operating the system 1 according to the flow diagram represented in FIG. 2, by means of which these functionalities can be implemented and in particular a reliable connection between the core drilling machine 5 and the feeding device 10 can be established and the emergency cutout functionality of the feeding device 10 can be tested and/or activated.

The method begins with the start S. In step S1, an actuation of the input device 4 or of the switch of the core drilling machine 5 by the user takes place. Then, in step S2, a signal that represents a connection inquiry is sent by the sending and receiving device 3 of the core drilling machine 5 and in step S3 is received by the sending and receiving device 13 of the feeding device 10.

In step S4, an actuation of the switch 12 of the feeding device 10 by the user is performed and the switch is transferred from the first position into the second position. In the then-following step S5, a further signal that represents a connection response to the connection inquiry is sent by the sending and receiving device 13 of the feeding device 10 and in step S6 is received by the sending and receiving device 3 of the core drilling machine 5. In step S7, it is checked by the open-loop and closed-loop control device 9 whether the further signal was received within a defined time period after sending of the signal by the sending and receiving device 13 of the feeding device 10.

With a negative result of the inquiry in step S7, the method is continued at step S1. With a positive result of the inquiry in step S7, the method is continued in step S8, the pairing and authenticating process is ended and at the same time a reliable connection of the core drilling machine 5 to the feeding device 10 is established. In order to establish the reliable connection between the core drilling machine 5 and the feeding device 10, it may be provided that further signals are transmitted between the sending and receiving device 3, 13.

In step S9, the emergency cutout functionality of the switch 12 of the feeding device 10 is tested or activated, it being possible for example for this also to be carried out at the same time as or before step S5, and in particular is implemented directly by a displacement of the switch 12 of the feeding device 10 from the first position into the second position.

In step S10, operation of the feeding device 10 and/or the core drilling machine 5 is enabled, so that a core drilling operation can be started to the extent described in more detail above when there is actuation of the on and off switch of the core drilling machine 5 by the user.

In step S11, it is checked whether the emergency cutout function is actuated. This is the case for example whenever the switch 12 is transferred by the user from the second position into the first position. For this purpose, the switch 12 is designed in particular as a pressure-operated switch or a pushbutton, which can be transferred from the second position into the first position by introducing a pressing force. With a positive result of the inquiry, the feeding device 10 and/or the drilling machine 5 is deactivated and operation is interrupted in step S12. In the next-following step S13, it is in turn checked whether the switch 12 has been displaced by the user from the first position into the second position. With a negative result of the inquiry, the method is continued with step S11. With a positive result of the inquiry in step S13, the method is similarly continued, as in the case of a negative result of the enquiry in step S11, with step S14.

In step S14, it is inquired whether relevant boundary conditions to be defined have changed to a predetermined extent and for example there is a further actuation of the switch 12 or the connection between the core drilling machine 5 and the feeding device 12 has been broken. With a positive result of the inquiry, the method is continued here at step S11. With a negative result of the inquiry, the method is ended at step E.

LIST OF REFERENCE CHARACTERS

1 System
3 Sending and receiving device
4 Input device
5 Main machine tool, core drilling machine
6 Output shaft
7 Drilling tool
8 Cutting edge
9 Open-loop and closed-loop control device
10 Auxiliary device, feeding device
11 Housing
12 Actuating device; switch
13 Sending and receiving device
14 Transmission device
15 Drill stand
16 Foot device
17 Guide rail
18 Fixing device
19 Rack device
21 Memory device
22 Housing
A, B Direction of movement
E End
N Direction of rotation
R Axis of rotation
S Start
S1 to S14 Step
W Base material

What is claimed is:

1. A method for operating a system, wherein the system comprises:
a main machine tool; and
an auxiliary device;
wherein the auxiliary device has only a single actuating device;
and comprising the steps of:
transferring the single actuating device of the auxiliary device from a first position into a second position by a user, wherein the transferring of the single actuating device of the auxiliary device from the first position into the second position tests and/or activates an emergency cutout functionality that is implemented in the single actuating device and additionally also causes a signal to be sent from a sending and receiving device of the auxiliary device, wherein the signal represents a connection response to a connection inquiry from the main machine tool, to the main machine tool in a pairing and authenticating process between the main machine tool and the auxiliary device;
wherein operation of the auxiliary device is prevented in the first position of the single actuating device and wherein operation of the auxiliary device and the main machine tool is enabled and the emergency cutout functionality is tested and/or activated in the second position of the actuating device;

wherein an open-loop and closed-loop control device of the main machine tool checks whether the signal is received by the main machine tool within a defined time period after the signal is sent from the sending and receiving device of the auxiliary device and wherein the pairing and authenticating process is ended and a connection of the main machine tool to the auxiliary device is established when the signal is received within the defined time period.

2. A system, comprising:

a main machine tool; and an auxiliary device with only a single actuating device;

wherein a transfer of the single actuating device from a first position into a second position by a user tests and/or activates an emergency cutout functionality that is implemented in the single actuating device and additionally also causes a signal to be sent from a sending and receiving device of the auxiliary device, wherein the signal represents a connection response to a connection inquiry from the main machine tool, to the main machine tool in a pairing and authenticating process between the main machine tool and the auxiliary device;

wherein operation of the auxiliary device is prevented in the first position of the single actuating device and wherein operation of the auxiliary device and the main machine tool is enabled and the emergency cutout functionality is tested and/or activated in the second position of the actuating device;

wherein an open-loop and closed-loop control device of the main machine tool checks whether the signal is received by the main machine tool within a defined time period after the signal is sent from the sending and receiving device of the auxiliary device and wherein the pairing and authenticating process is ended and a connection of the main machine tool to the auxiliary device is established when the signal is received within the defined time period.

3. The system as claimed in claim 2, wherein the actuating device is a switch, a button, or a magnetic contact.

4. The system as claimed in claim 2, wherein the auxiliary device is a feeding device for the main machine tool.

5. The system as claimed in claim 4, wherein the main machine tool is a core drilling machine or a wall sawing machine.

* * * * *